United States Patent [19]
Hussaini

[11] Patent Number: 5,937,474
[45] Date of Patent: Aug. 17, 1999

[54] WIPER ADAPTER

[75] Inventor: Saied Hussaini, Miami, Fla.

[73] Assignee: Rally Manufacturing, Inc., Miami, Fla.

[21] Appl. No.: 09/042,640

[22] Filed: Mar. 17, 1998

[51] Int. Cl.⁶ ........................................... B60S 1/40
[52] U.S. Cl. .......................................... 15/250.32
[58] Field of Search ................ 15/250.32, 250.31, 15/250.351; 403/3, 4, 321, 326

[56] References Cited

U.S. PATENT DOCUMENTS

| | | | |
|---|---|---|---|
| 4,878,263 | 11/1989 | Raymond | 15/250.32 |
| 5,084,933 | 2/1992 | Buechele | 15/250.32 |
| 5,289,608 | 3/1994 | Kim | 15/250.32 |
| 5,611,103 | 3/1997 | Lee | 15/250.32 |

FOREIGN PATENT DOCUMENTS

| | | | |
|---|---|---|---|
| 329515 | 8/1989 | European Pat. Off. | 15/250.32 |
| 3618288 | 12/1987 | Germany | 15/250.32 |
| 2034580 | 6/1980 | United Kingdom | 15/250.32 |
| 2156666 | 10/1985 | United Kingdom | 15/250.32 |

*Primary Examiner*—Gary K. Graham
*Attorney, Agent, or Firm*—Liniak, Berenato Longacre & White

[57] ABSTRACT

A windshield wiper adapter accommodates different types and different size wiper arms. The adapter includes a slot to accommodate both ³⁄₁₆ and ¼ inch diameter pins of a pin type wiper arm as well as the ability to connect to different size hook type wiper arms and bayonet type wiper arms. Each sidewall of the adapter has a transverse notch to permit flexure enhancing installation and removal. The outer side surfaces of each side wall has raised bearing surfaces to promote free rotation when subject to a load bearing against the wiper assembly. Different size hook arm retention tabs extend inwardly from each sidewall to enhance installation. An extended bayonet release tab is provided to promote disassembly.

5 Claims, 4 Drawing Sheets

14   13

WIPER ADAPTER

BACKGROUND OF THE INVENTION

1. Field of the Invention

The present invention is related to a windshield wiper connector, and more particularly to a wiper adapter which facilitates connection of diverse wiper arm and wiper assemblies.

2. Description of the Prior Art

Various types of windshield wiper arm connectors for windshield assemblies are well known in the art. Such windshield wiper frame connectors include a pair of ears pivotally connected to a pin type arm as shown in U.S. Pat. Nos. 3,425,098 and 3,780,395 to Quinlan, et al., both of which are incorporated herein by reference. However, these prior art wiper frame connectors are costly to manufacture, difficult to assemble and do not accommodate diverse wiper assemblies.

U.S. Pat. No. 5,289,608 to Kim discloses a windshield wiper frame connector which accommodates different size wiper arms and is incorporated herein by reference. However, the '608 patent to Kim suffers from several drawbacks which the instant invention serves to alleviate and improve upon.

SUMMARY OF THE INVENTION

The object of the present invention is to provide a windshield wiper adapter which accommodates different types and different size wiper arms which improves upon the wiper connectors of the prior art. The adapter includes a slot to accommodate both 3/16 and 1/4 inch diameter pins of a pin type wiper arm as well as the ability to connect to different size hook type wiper arms and bayonet type wiper arms. Each sidewall of the adapter has a transverse notch to permit flexure thereby enhancing installation and removal. The outer side surfaces of each side wall has raised bearing surfaces to promote free rotation when subject to a load bearing against the wiper blade unit. Different size hook arm retention tabs extend inwardly from each sidewall to enhance installation. An extended bayonet release tab is provided to promote disassembly.

DETAILED DESCRIPTION OF THE PREFERRED EMBODIMENT

Figure 1:
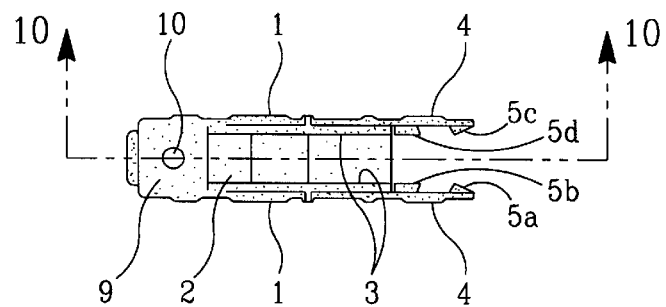
FIG. 1 is a top elevational view of the wiper adapter according to the preferred embodiment of the invention.
Figure 2:
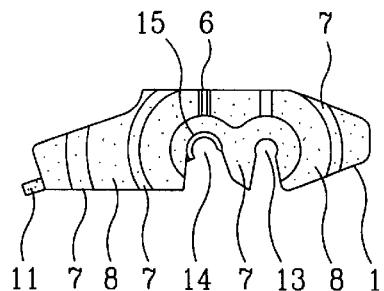
FIG. 2 is a side view of the wiper adapted shown in FIG. 1.

The preferred embodiment will now be discussed with reference to the drawing figures.

FIG. 1 represents a top view of the wiper adapter according to the preferred embodiment. A member body is defined by a body of pair of opposing sidewalls (1) connected by a cross member (2). A channel 3 is formed and defined between the sidewalls (1) to accommodate a hook type wiper arm of a certain width. Hook arms of different widths are accommodated by either being disposed within or on top of the channel (3).

The sidewalls (1) each have a wing portion (4) extending forwardly. A pair of retention tabs (5a, 5b, 5c, 5d) are formed on the inner surface of each of the wing portions (4). Retention tabs (5a) and (5b) associated with one of the side walls each extend more inwardly than a corresponding opposite retention tab (5c) and (5d). Such an arrangement has been shown to provide a dramatic improvement in the ease of installation and removal of hook type wiper arms.

A transverse notch (6) is formed in each of the side walls (1) to promote flexure of the wiper adapter. In the preferred embodiment the transverse notch (6) extends downward from a top portion of each side wall. Such an arrangement particularly provides proper flexure when the wiper adapter is attached to a pin type wiper arm.

Each of the sidewalls (1) has an external surface with raised bearing surfaces (7). Such raised bearing surfaces (7) are preferably arranged to define recessed radial channels (8). The recessed radial channels provide space for foreign material such as grease and dirt etc. thereby promoting free rotation of the wiper adapter when pressed against a transverse portion of the main bridge of a wiper blade.

Figure 3:
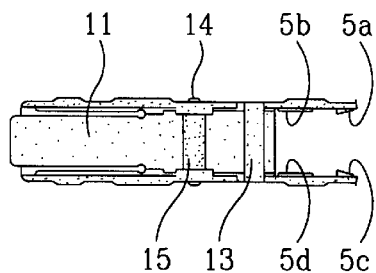
FIG. 3 is a bottom top elevational view of the wiper adapter of FIG. 1.
Figure 4:
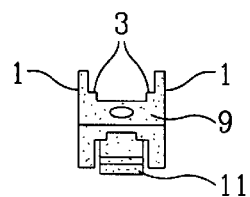
FIG. 4 is a rear view of the wiper adapter of FIG. 1.
Figure 5:
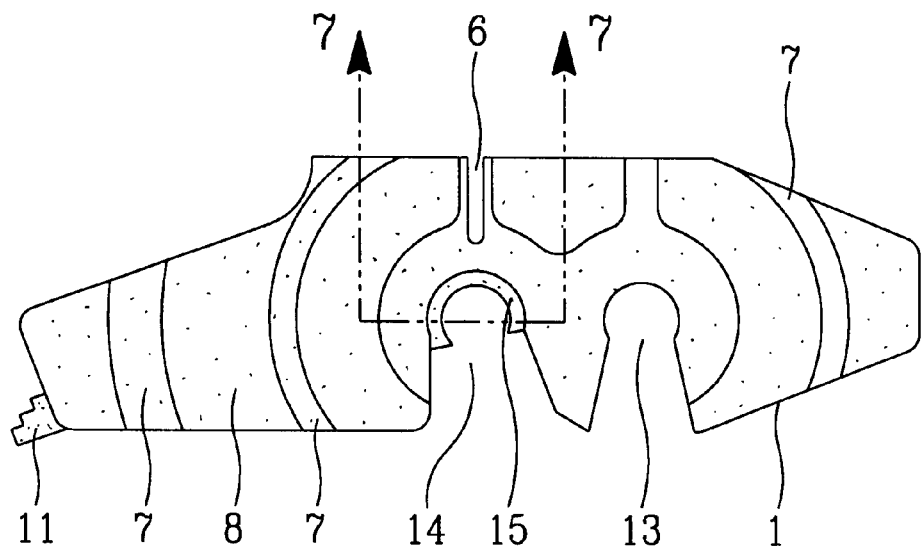
FIG. 5 is an enlarged side view of the wiper adapter of FIG. 1.
Figure 6:
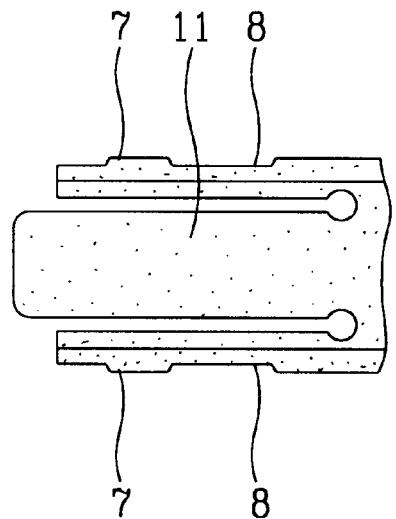
FIG. 6. is an enlarged partial bottom view of the rear portion of the wiper adapter of FIG. 1.
Figure 7:
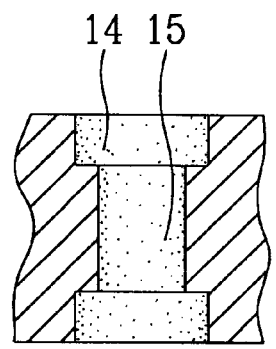
FIG. 7 is a cross sectional view taken along line 7—7 of FIG. 5.
Figure 8:
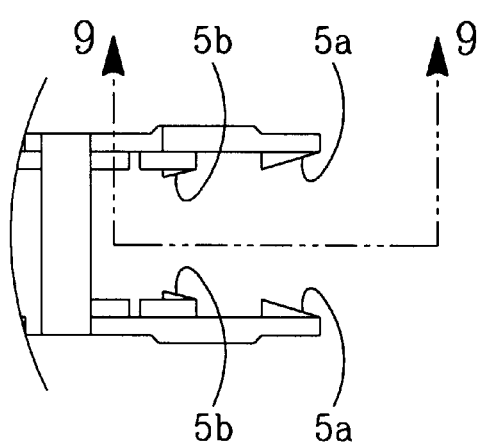
FIG. 8 is an enlarged partial top view of the front portion of the wiper adapter of FIG. 1.
Figure 9:
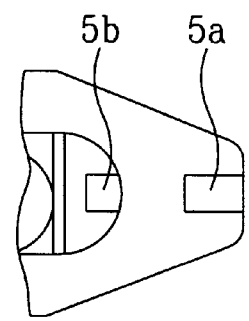
FIG. 9 is a partial sectional view taken along line 9—9 of FIG. 8.
Figure 10:
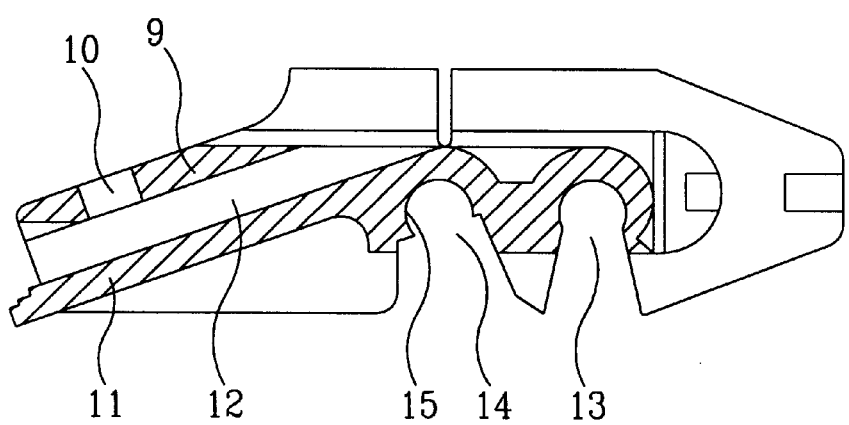
FIG. 10 is a cross sectional view taken along line 10—10 of FIG. 1.
Figure 11:
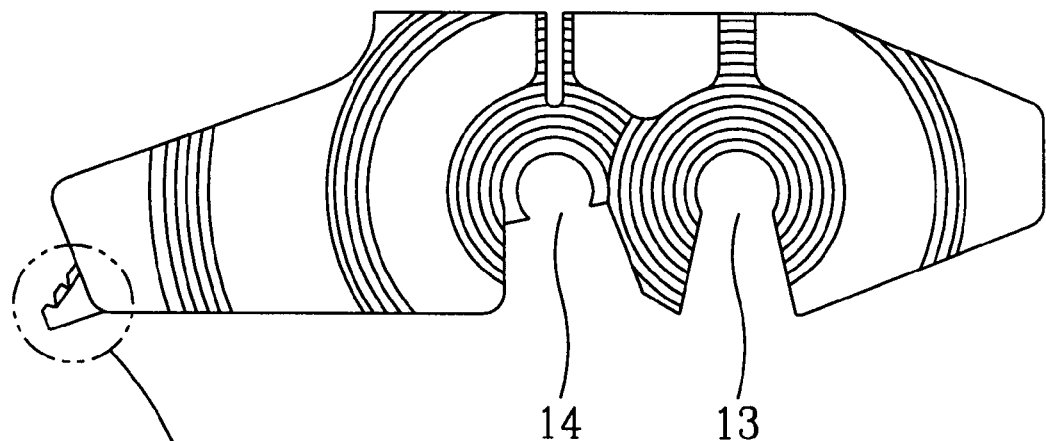
FIG. 11 is an enlarged side view of the wiper adapter according to an alternate embodiment.
Figure 12:
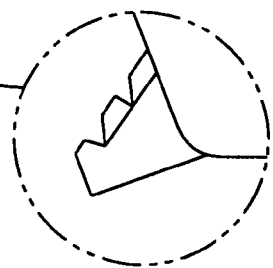
FIG. 12 is an enlarged view of section 12 of FIG. 11.

The wiper adapter has a bayonet retention member (9) with a bore (10) to receive an extended portion of a bayonet type wiper arm. FIG. 3 reveals a cantilevered release tab (11) extending from the cross a rear portion of the cross member (2). Referring to FIG. 10, a channel (12) is defined between the cantilevered release tab (11) and the bayonet retention member (9) to retain a portion of the bayonet type wiper arm. The release tab (11) extends substantially more rearward than the bayonet retention member to facilitate easy removal of the bayonet arm. The release tab (11) is simply depressed at the grooved portion (13) such that the release tab deflects downward sufficient to allow the extended portion of the bayonet to be removed from the bore (10). Such an arrangement has been shown to both increase the ease of installation and removal of the bayonet arm.

A first slot (13) (preferably a keyhole slot) is provided in a lower portion of the wiper adapter for rotatably receiving and retaining a transverse pin of a wiper blade unit.

A second slot (14) is also provided in the lower portion of the wiper adapter adjacent the first slot. The second slot (14) is adapted to rotatably receive and retaining a pin of a pin type wiper arm. A raised arc surface (15) is also provided. In the preferred embodiment the second slot (14) and raised arc surface (15) have dimensions to enable respective retainment of 1/4 and 3/16 inch diameter pin arms. This embodiment facilitates the retainment of different size pin arms.

Thus it can be easily seen that the wiper adapter of the invention thus described provides the ability for connecting a wiper blade assembly to diverse wiper arms. The assembly and disassembly of the wiper adapter to the wiper blade unit and wiper arm are greatly improved over the wiper connectors of the prior art.

While the foregoing invention has been shown and described with reference to a preferred embodiment, it will be understood by those possessing skill in the art that various changes and modifications may be made without departing from the spirit and scope of the invention.

I claim:

1. A windshield wiper adapter for connecting a wiper blade unit to a wiper arm, said adapter comprising:

an elongated body member having a pair of spaced apart opposing sidewalls, each said sidewalls defining an inner and outer surface, said inner surfaces facing one another and having a cross-member formed therebetween and connecting said pair of sidewalls, each of said side walls having a transverse notch extending downward from a top portion thereof to facilitate flexure of said elongated body about a line extending between and substantially orthogonal to said inner surfaces, said outer surfaces of said side walls having raised surface areas defining recessed radial channels to promote rotation of said elongated body when bearing against a wiper main bridge, each of said sidewalls having a front wing portion as an extension of said sidewalls;

a first slot disposed in a lower portion of said body member for rotatably receiving a transverse pin;

a second slot disposed in said lower portion of said body member for rotatably receiving a pin of a first pin shaped wiper arm;

an arc-shaped surface located within said second slot, said arc shaped surface being provided for receiving a pin of a second pin shaped wiper arm having a smaller diameter than said pin of said first pin shaped wiper arm;

a first pair of opposing hook arm retention tabs disposed on said opposing inner surfaces of said wing portions of said sidewalls, one of said first pair of opposing arm retention tabs extending substantially more inwardly than the other of said first pair of opposing arm retention tabs;

a second pair of opposing hook arm retention tabs disposed on said opposing inner surfaces of said front wing portions of the sidewalls, said first pair of opposing hook arm retention tabs being adjacent to said second pair of opposing hook arm retention tabs, said first and second pair of opposing hook arm retention tabs defining a first space therebetween for receiving and locking outer surfaces of a first hook portion of a first hook shaped wiper arm having a first width, one of said second pair of opposing hook arm retention tabs extending substantially more inward than the other of said second pair of opposing hook arm retention tabs, said second pair of opposing hook arm retention tabs and said cross member defining therebetween a second predetermined width less than said first predetermined width for alternatively receiving and locking outer surfaces of a second hook portion of a second hook shaped wiper arm having a second width;

a bayonet retention member disposed between and connecting said inner surfaces of said sidewalls; and a cantilevered release tab extending from said cross member disposed below said bayonet retention member, said cantilevered release tab and said bayonet retention member together defining a channel therebetween for engaging and supporting a portion of a bayonet shaped arm, said cantilevered release tab having an extended portion extending substantially further rearward than said bayonet retention member.

2. A windshield wiper adapter for connecting a wiper blade unit to a wiper arm, said adapter comprising:

a pair of spaced apart opposing sidewalls extending in a longitudinal direction and each having an inner and outer surface, each of said sidewalls having a transverse notch extending downwardly from a top portion thereof to facilitate flexure of said side walls about a line extending between and substantially orthogonal to said inner surfaces;

a cross member formed between and connecting said pair of sidewalls, said cross member having a retaining means for selectively retaining diverse sized pin shaped wiper arms, bayonet wiper arms and hook shaped wiper arms and having connecting means for connecting said adapter to a wiper blade unit, wherein said notch is located on said top portion along an edge of each of said sidewall, and said line extending between and substantially orthogonal to said inner surfaces is disposed substantially at a midpoint along said longitudinal direction.

3. A windshield wiper adapter for connecting a wiper blade unit to a wiper arm, said adapter comprising:

a pair of spaced apart opposing sidewalls each having an inner and outer surface, said outer surfaces of each of said sidewall having a raised bearing surface defining at least one small radial channel to facilitate free rotation of said adapter against a vertical member of a wiper main bridge;

a cross member formed between and connecting said pair of sidewalls, said cross member having a retaining means for selectively retaining diverse sized pin shaped wiper arms, bayonet wiper arms and hook shaped wiper arms and having a slot disposed in a lower portion of said cross member for connecting said adapter to a wiper blade unit; and at least one transverse notch extending downwardly from a top portion of each of said sidewalls in a direction toward said slot to facilitate flexure of said side walls about a line extending between and substantially orthogonal to said inner surfaces.

4. A windshield wiper adapter for connecting a wiper blade unit to a wiper arm, said adapter comprising:

a pair of spaced apart opposing sidewalls each having an inner and outer surface, each of said sidewalls having a front wing portion as an extension of said sidewalls and having inner surfaces;

a pair of hook arm retention tabs oppositely disposed on each of said inner surfaces of said wing portion, wherein said hook arm retention tabs disposed on a first one of said wing portions extends substantially further inward than corresponding opposite hook arm retention tabs disposed on the other wing portion; and a cross member formed between and connecting said pair of sidewalls, said cross member having a retaining means for selectively retaining one of diverse sized pin shaped wiper arms, bayonet wiper arms and hook shaped wiper arms and having connecting means for connecting said adapter to a wiper blade unit.

5. A windshield wiper adapter for connecting a wiper blade unit to a wiper arm, said adapter comprising:

a pair of spaced apart opposing sidewalls each having an inner and outer surface, a cross member formed between and connecting said pair of sidewalls, said cross member having a slot disposed in a lower portion of said cross member for connecting said adapter to a wiper blade unit; and at least one transverse notch extending downwardly from a top portion of each of said sidewalls in a direction toward said slot to facilitate flexure of said side walls;

a bayonet retention member disposed between and connecting said pair of sidewalls adjacent a rear and a top portion thereof, said bayonet retention member having a bore to accommodate a projecting portion of a bayonet; and a cantilevered release tab extending rearward from said cross member, said bayonet retention member and said release tab defining a bayonet retention channel therebetween, wherein said release tab extends substantially more rearwardly than said bayonet retention member to facilitate easy removal of said bayonet.

* * * * *